July 10, 1956  A. T. DELL  2,754,147
INSECT DEFLECTOR FOR VEHICLES
Filed Nov. 19, 1953

INVENTOR.
ANGUS T. DELL
BY Richard von K. Bruns
Attorney

United States Patent Office 2,754,147
Patented July 10, 1956

2,754,147

INSECT DEFLECTOR FOR VEHICLES

Angus T. Dell, Syracuse, N. Y., assignor of fifty per cent to Anthony Hogan, Syracuse, N. Y.

Application November 19, 1953, Serial No. 393,168

1 Claim. (Cl. 296—91)

This invention relates to accessories for motor vehicles, and has particular reference to a novel device for deflecting insects, snow and the like from the windshields of motor vehicles such as passenger cars, trucks and busses.

Various types of insect or bug deflectors have heretofore been developed for motor vehicles, and the function of these devices is to deflect the air currents away from the windshield of the vehicle as the latter moves forwardly and thus prevent flying insects, snow or other airborne matter from splattering against the windshield and obstructing the driver's vision. Usually the deflecting devices are mounted on the hood of the vehicle and practically all of the prior constructions include some kind of an upright shield which does the actual deflecting of the air currents. Many of these shields are large enough to offer appreciable resistance to the air as the vehicle moves along but a far more serious disadvantage of this type of construction is that the upright of substantially upright shield extends into the driver's line of vision. This, of course, can be very distracting and tiring, and might even be a contributing factor in an accident.

In order to eliminate the aforementioned disadvantages of the previously developed devices, it is the primary object of the present invention to provide an insect deflector for a motor vehicle of such size and conformation that its presence is not distracting to the driver of the vehicle.

Another important object of the invention is to provide an insect deflector for a motor vehicle which is not distracting to the driver of the vehicle and yet functions efficiently to deflect insects, snow and the like from all parts of the vehicle windshield.

A further object of the invention is to provide an insect deflector for a motor vehicle which offers a minimum amount of resistance to the air as the vehicle moves along.

Still another object of the invention is to provide an insect deflector for a motor vehicle which may be quickly and easily mounted on the vehicle.

A still further object of the invention is to provide an insect deflector for a motor vehicle which is simple and economical to manufacture.

Other objects and advantages will become apparent from the following detailed description read in conjunction with the accompanying drawings wherein like reference numbers refer to corresponding parts in all the views.

Figure 1:
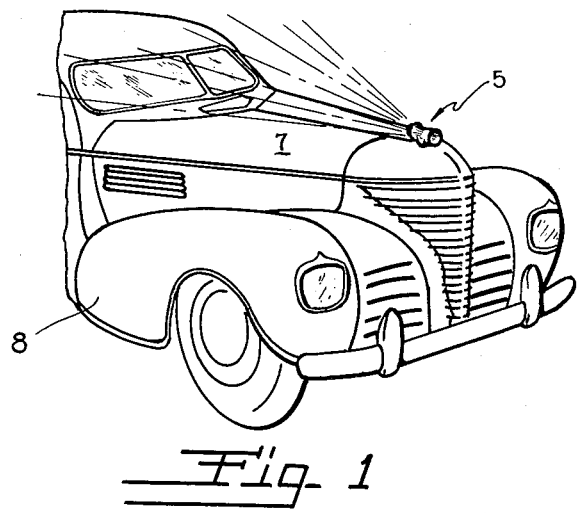
Figure 1 is a fragmentary perspective view of a passenger car equipped with an insect deflector embodying the invention.
Figure 2:
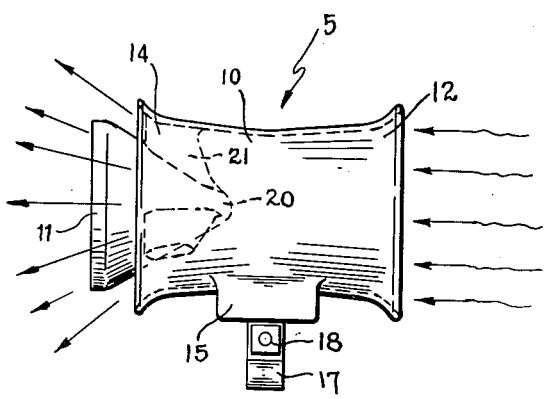
Figure 2 is an enlarged side elevation of the insect deflector shown in Figure 1.
Figure 3:
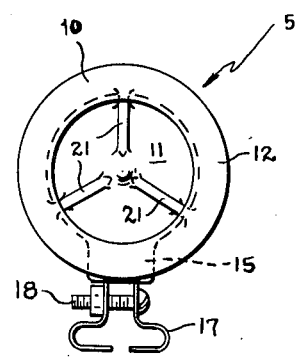
Figure 3 is an enlarged front end elevation of the insect deflector shown in Figure 1.

Having reference now to the drawings, which illustrate a typical embodiment of the invention for the purpose of the disclosure, 5 generally indicates the insect deflector mounted on the forward portion of the hood 7 of a motor vehicle 8. While the illustrated motor vehicle 8 represents a passenger car, it will be understood, of course, that the device may be employed equally well on other types of vehicles such as busses and trucks. Deflector 5 comprises a tubular member 10 of some suitable material such as plastic or metal and a substantially conical member 11 of similar material.

The tubular member 10 is outwardly flared at its ends as shown, and is mounted on the vehicle in such a manner that ends 12 and 14 are the front and rear ends respectively. Integrally formed on the bottom portion of the tubular member is a lug or block 15 from which depend the two halves of a fastening clamp 17. The upper ends of clamp 17 are moulded into or force fitted into block 15, and the clamping halves are formed of spring steel or other similar resilient material so that they can be drawn together or sprung apart by adjustment of the screw and nut arrangement 18. The deflector is adapted to be mounted on the vehicle with its longitudinal axis substantially parallel to the longitudinal axis of the vehicle and is secured in position by tightening the clamp 17 on the hood ornament if the latter is not too large, or on the trim moulding which usually extends longitudinally along the center line of the hood.

The conical member 11 is supported in the rear portion of the tubular member 10, in spaced relation thereto, with its apex 20 projecting towards the front end 12 of the tubular member. Member 11 is supported by means of one or more struts 21 of streamlined or airfoil conformation which position the member so that its axis is colinear with that of the tubular member. In this manner, the members 10, 11 define a substantially annular passage adjacent the rear end 14 of the tubular member.

In operation, during forward travel of the vehicle, air enters the front end 12 of the tubular member 10, as indicated by the arrows, and passes in a substantially straight path therethrough until it strikes the sloping surface of the conical member 11. The member 11 directs the air into the annular passage formed between the members 10, 11 so that when it emerges from the rear end 14 of the tubular member it has been deflected upwardly and outwardly and thus causes any insects, snow or the like encountering the air stream to be deflected over or around the windshield. It has been found that a tubular member of relatively small diameter and a conical member of corresponding proportions will serve very effectively to deflect air away from the vehicle windshield, and because the deflector can be made in a small and compact form its presence does not distract the driver of the vehicle. Furthermore, the subject deflector does not offer as much resistance to the air as the larger shield type deflector of prior devices. The deflector disclosed herein is, in addition, relatively simple and inexpensive to manufacture and therefor can be marketed at a cost within the means of any motorist.

This invention may be embodied in other specific forms without departing from the spirit or essential characteristics thereof. The embodiments disclosed are therefor to be considered in all respects as illustrative and not restrictive, the scope of the invention being indicated by the appended claim.

What I claim is:

In a device for deflecting insects, snow, and the like, from the windshield of a motor vehicle, a unitary structure comprising a tubular member having an outwardly flared portion at each end thereof, a substantially acute angled conical member mounted in the flared rear end of said tubular member with its apex directed toward the front end thereof, said conical member being supported in spaced relation to said tubular member by a plurality of struts of airfoil conformation extending between said members, said spaced conical and tubular members defining a wide annular air passage therebetween, the portion of said tubular member forward of said conical member apex defining an unimpeded air passage in communication with said annular passage, a lug integrally formed with said tubular member on the underside thereof, and clamping means fixedly mounted in said lug and extending downwardly therefrom to detachably secure the unitary member above the hood of the vehicle.

References Cited in the file of this patent

UNITED STATES PATENTS

| | | |
|---|---|---|
| 940,270 | Patrick | Jan. 11, 1909 |
| 1,849,415 | Yurkovitch | May 15, 1932 |
| 1,901,806 | Fulton | Mar. 14, 1933 |
| 1,911,169 | Trogner | May 23, 1933 |
| 2,133,927 | Riel | Oct. 18, 1938 |
| 2,515,604 | Kish | July 18, 1950 |